(12) United States Patent
Hentunen

(10) Patent No.: US 8,763,121 B2
(45) Date of Patent: Jun. 24, 2014

(54) MITIGATING MULTIPLE ADVANCED EVASION TECHNIQUE ATTACKS

(75) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 325 days.

(21) Appl. No.: 12/930,954

(22) Filed: Jan. 20, 2011

(65) Prior Publication Data

US 2012/0192272 A1 Jul. 26, 2012

(51) Int. Cl.
*G06F 21/00* (2013.01)

(52) U.S. Cl.
USPC ............ 726/23; 713/165; 713/187; 709/224; 709/247; 726/3; 726/24; 726/6; 455/458; 455/426.1

(58) Field of Classification Search
USPC ...................................... 726/22, 23
See application file for complete search history.

(56) References Cited

U.S. PATENT DOCUMENTS

| | | | |
|---|---|---|---|
| 6,535,867 B1* | 3/2003 | Waters | 1/1 |
| 7,024,593 B1* | 4/2006 | Budd et al. | 714/48 |
| 7,792,147 B1* | 9/2010 | Hernacki | 370/474 |
| 7,984,018 B2* | 7/2011 | Rodriguez et al. | 707/625 |
| 8,201,070 B2* | 6/2012 | Moltchanov et al. | 714/807 |
| 2003/0115485 A1* | 6/2003 | Milliken | 713/201 |
| 2003/0174662 A1* | 9/2003 | Malkamaki | 370/310 |
| 2004/0078462 A1* | 4/2004 | Philbrick et al. | 709/224 |
| 2006/0293048 A1* | 12/2006 | Swanson et al. | 455/426.1 |
| 2007/0005973 A1* | 1/2007 | Mynam et al. | 713/171 |
| 2009/0006932 A1* | 1/2009 | Biran et al. | 714/807 |
| 2009/0119774 A1* | 5/2009 | Moss | 726/23 |
| 2010/0095064 A1* | 4/2010 | Aviles | 711/118 |
| 2010/0122088 A1* | 5/2010 | Oxford | 713/168 |
| 2011/0030057 A1* | 2/2011 | Chen et al. | 726/23 |
| 2011/0047620 A1* | 2/2011 | Mahaffey et al. | 726/23 |
| 2011/0252473 A1* | 10/2011 | Wiseman | 726/22 |
| 2013/0332994 A1* | 12/2013 | Kumar | 726/3 |

FOREIGN PATENT DOCUMENTS

WO WO 2010070280 A1 * 6/2010

OTHER PUBLICATIONS http://ieeexplore.ieee.org/stamp/stamp.jsp?tp=&arnumber=5374837|Locating Network Domain Entry and Exit point/path for DDoS Attack Traffic|2009|Thing et al.*
Multi-Character Processor Array for Pattern Matching in Network Intrusion Detection System|http://ieeexplore.ieee.org/stamp/stamp.jsp?tp=&arnumber=4482814| Chang et al.|2008.*
The Effect of Segmentation Mismatch on Quality of Continuous Media Transmission by Bluetooth |http://ieeexplore.ieee.org/stamp/stamp.jsp?tp=&arnumber=1047313||Okura et al.|2002.*
A Payload driven Security model for flooding attacks in Active networks|http://ieeexplore.ieee.org/stamp/stamp.jsp?tp=&arnumber=4809140|Jayashree et al.|2009.*
Using Machine Learning Techniques to Identify Botnet Traffic|Livadas et al.|pp. 967-974|2006.*

* cited by examiner

*Primary Examiner* — Mahfuzur Rahman
(74) *Attorney, Agent, or Firm* — Harrington & Smith

(57) ABSTRACT

A method of identifying a potential attack in network traffic includes payload data transmitted to a host entity in the network. The method includes: performing a first data-check on one or more data bytes of the payload data at the host entity; performing a second data-check, equivalent to the first data-check, on data of the network equivalent to the one or more bytes of payload data; and comparing the results of the first and second data-checks to determine if there is a mismatch, the mismatch being an indication of a potential attack.

21 Claims, 3 Drawing Sheets

MITIGATING MULTIPLE ADVANCED EVASION TECHNIQUE ATTACKS

TECHNICAL FIELD

The present invention relates to the field of mitigating attacks in a computer security system, where the attack may employ multiple concurrent Advanced Evasion Techniques.

BACKGROUND

Computer security systems have to contend with increasingly sophisticated attacks, or exploits from malicious persons (i.e. hackers) attempting to gain access to data or software in a computer. An Intrusion Detection System (IDS) is an information security device that monitors and analyses data to detect when security is breached, while an Intrusion Prevention System (IPS) is a device that identifies malicious activity and attempts to stop or block the activity. IDS and IPS devices are often integrated into an IDS/IPS or Intrusion Detection and Prevention System (IDPS).

Techniques of bypassing an information security device in order to deliver an attack to a target network entity without detection are known as evasions. Evasions are typically used to counter a network-based IDS/IPS but can also be used to by-pass firewalls. Just as viruses can be detected and blocked by anti-virus software, evasions can be stopped through anti-evasion solutions. However, it has recently been recognised that more advanced evasion techniques (AETs) have been developed, and it has been reported that most, if not all currently available IDS/IPS solutions are unable to detect or prevent an attack if more than one AET is used concurrently.

The present invention has been conceived with the foregoing in mind. However, before describing this further some explanation is required of the terms that will be used particularly in relation to the embodiments described.

An attack is any attempt to destroy, expose, alter, disable, steal or gain unauthorized access to or make unauthorized use of a computer asset. An exploit is a piece of software, a chunk of data, or sequence of commands that takes advantage of a bug, glitch or vulnerability in order to cause unintended or unanticipated behavior to occur on a computer. Examples might include gaining control of a computer system or allowing a privilege escalation or a denial of service attack. Malware is malicious software designed to secretly access a computer system without the owner's informed consent, and may include a variety of forms of hostile, intrusive, or annoying software or program code, such as computer viruses, worms, trojan horses, spyware, dishonest adware, scareware, crimeware, most rootkits, and other malicious or undesirable software.

As used herein, an attack may be considered also to include any of the above.

The term "vulnerability", as used herein refers to the term defined by the Common Vulnerabilities and Exposures (CVE®). CVE defines a vulnerability as a mistake in software that can be directly used by a hacker to gain access to a system or network. CVE is a dictionary of identifiers of known vulnerabilities that makes it easier to share data across different network security databases.

Embodiments are described below in relation to network communications at certain levels, or layers, such as described in the ISO's Open Systems Interconnection (OSI) model. In the OSI model a layer is a collection of conceptually similar functions, implemented within each layer by one or more entities. Each entity interacts directly only with the layer immediately beneath it, and provides facilities for use by the layer above it. Protocols enable an entity in one host to interact with a corresponding entity at the same layer in another host. Most network protocols used today are based on TCP/IP stacks.

In at least one version of the OSI model there are seven layers. Starting at the lowest layer, layer 1, which is the physical layer, the layers above are, in order, 2—the data Link layer, 3—the Network layer, 4—the Transport layer, 5—the Session layer, 6—the Presentation layer, and 7—the Application layer. At any given layer, N, two entities (N-peers) interact by means of the N protocol by transmitting protocol data units (PDUs). A Service Data Unit (SDU) is a specific unit of data that has been passed down from one layer to a lower layer, and which the lower layer has not yet encapsulated into a protocol data unit (PDU) of its own layer. Thus, an SDU is a set of data that is sent by a user of the services of a given layer, and is transmitted semantically unchanged to a peer service user. The SDU is the 'payload' of a given PDU. Accordingly, where the embodiments described below refer to a particular level or layer, such as the Application level, to describe the principles of the invention, it should be understood that the same principles may be applied at other layers, and where data is referred to as payload it should not be construed as being limited to data at any particular layer.

SUMMARY

According to a first aspect of the invention, there is provided a method of identifying a potential attack in network traffic that includes payload data transmitted to a host entity in the network. The method includes: performing a first data-check on one or more data bytes of the payload data at the host entity; performing a second data-check, equivalent to the first data-check, on data of the network equivalent to the one or more bytes of payload data; and comparing the results of the first and second data-checks to determine if there is a mismatch, the mismatch being an indication of a potential attack.

The first data-check may be performed by a Host Intrusion Protection System, HIPS and the second data-check performed by an IDS/IPS. The HIPS may be provided with a communication channel to the IDS/IPS, the results of the first and/or the second data-check being transmitted over the communication channel for the comparing. The HIPS may be provided with configuration information specifying network connection types for which the method of identifying a potential attack is to be applied. The method may further comprise sending the configuration information to the IDS/IPS.

The payload data may be an application level payload, the HIPS using network hooks for accessing the payload to perform the first data-check.

The data-checks may be compared as the bytes are transmitted over the network.

The first data-check may be performed on a server monitoring traffic relating to a service, the method further comprising performing a predetermined action in response to identification of a potential attack. The predetermined action may comprise terminating the connection, or logging the attack, or both.

Alternatively, the first data-check may be performed on a client computer monitoring traffic between the client and a remote network entity, the method further comprising notifying the user of the client computer of the attack. The method may further comprise providing an option for the user to terminate the connection or to accept the payload. Alternatively, the method may comprise automatically terminating the connection.

The first and second data-checks may comprise calculating a checksum. The checksum calculation may be a sliding checksum with offset information.

The potential attack may be identified as an attack that might include a plurality of Advanced Evasion Techniques, AETs.

According to a second aspect of the invention there is provided a method of identifying an attack in network traffic that includes application level payload transmitted to/from a host over a network connection and that might include a plurality of Advanced Evasion Techniques, AETs. A Host Intrusion Protection System, HIPS, is provided, with a communication channel to an IDS/IPS. The HIPS accesses at least a portion of the application level payload and calculates a checksum thereof. The IDS/IPS performs an equivalent checksum calculation for an equivalent portion of the application level payload assembled therein. The checksums calculated by the HIPS and the IDS/IPS are compared and an attack is signalled if there is a mismatch.

According to a third aspect of the invention there is provided a system for identifying a potential attack in network traffic that includes payload data transmitted to a host entity in the network. A first data-checker is configured to perform a first data-check on one or more data bytes of the payload data. A second data-checker is configured to perform a second data-check, equivalent to the first data-check, on data of the network equivalent to the one or more bytes of payload data. A comparator compares the results of the first and second data-checks to determine if there is a mismatch, the mismatch being an indication of a potential attack.

The first data-checker may comprise a HIPS on the host entity, and the second data-checker may comprise an IDS/IPS, the system further comprising a communication channel connecting the HIPS and the IDS/IPS.

The HIPS may be installed on a server and is configured to monitor traffic relating to a service. Alternatively, the HIPS may be installed on a client computer and is configured to monitor traffic between the client and a remote network entity.

According to another aspect of the invention there is provided a system for identifying an attack in network traffic that includes application level payload and that might include a plurality of Advanced Evasion Techniques, AETs. The system comprises: a host computer that includes a network connection over which the network traffic is sent/received and a HIPS; an IDS/IPS; and a communication channel connecting the HIPS and the IDS/IPS. The HIPS is configured to access at least a portion of the application level payload and to calculate a checksum thereof. The IDS/IPS is configured to perform an equivalent checksum calculation for an equivalent portion of the application level payload assembled therein. A comparator compares the checksums calculated by the HIPS and the IDS/IPS and for signalling an attack if there is a mismatch.

According to another aspect of the invention there is provided a computer network entity. The entity comprises a data-check comparator configured to perform a comparison between a first data-check of at least a portion of a payload of network traffic destined for a host entity and a second data-check, equivalent to the first data-check, on data of the network traffic equivalent to the payload portion. The entity signals a potential attack if the data-check comparison indicates a mismatch between the first and second data-checks.

DETAILED DESCRIPTION

Figure 1:
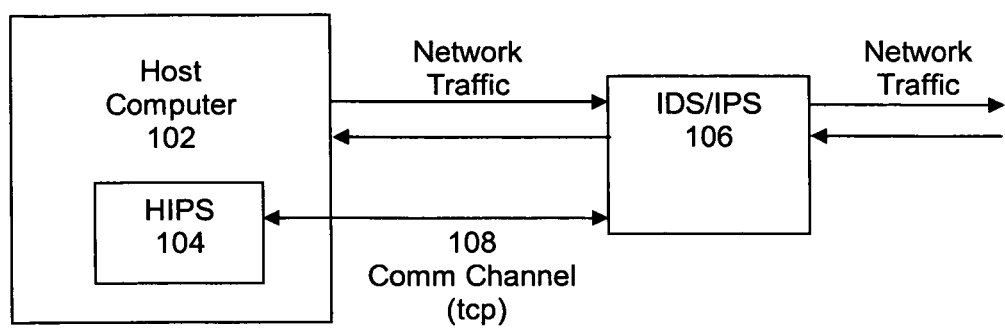
FIG. 1 is a schematic block diagram of a network host entity showing data transfer paths.

Referring to FIG. 1, a host computer 102 resides as an entity in a network. Host computer 102 sends and receives data in the form of network traffic to/from other entities in the network. The host computer 102 has an installed HIPS 104. The network traffic is also monitored by an IDS/IPS 106. The HIPS 104 and IDS/IPS 106 have a dedicated communication channel open, which, in the embodiment shown, is a TCP channel (i.e. uses the TCP protocol).

The network traffic arriving at, or being sent by host 102 is encapsulated as PDUs, the SDUs of which comprise the payload data. For example, the payload may be application level (layer 7) data, encapsulated in presentation layer (layer 6) PDUs that make up the network traffic. The HIPS 104 analyses the payload (application level) data, while the IDS/IPS analyses the network traffic.

Embodiments of the invention are based on the idea that the only way to be sure how an attack will manifest itself on a target host computer is to inspect application level traffic payload on the target host itself. This is because it is the target host computer that implements the specific TCP/IP stack particulars, and the ways that different attacks will then be interpreted by the target host will only be evident from the payload at that level. However, for the IDS/IPS of the target network to perform the task of inspecting the payload data would involve a complex and CPU-intensive analysis of the PDUs involving exploit detection logic, and updating of databases. Instead, it is proposed to perform a simple comparison to check if the picture of the payload data in the traffic that is monitored by the IDS/IPS is the same as the actual payload at the target host computer. If there is a discrepancy, it is an indication of a potential attack.

Thus, while the IDS/IPS does the actual attack detection from the application payload, the IDS/IPS is provided with feedback indicating if it has the correct picture of the application payload. If it doesn't, then a potential multi-AET attack is assumed to be in place.

Figure 2:
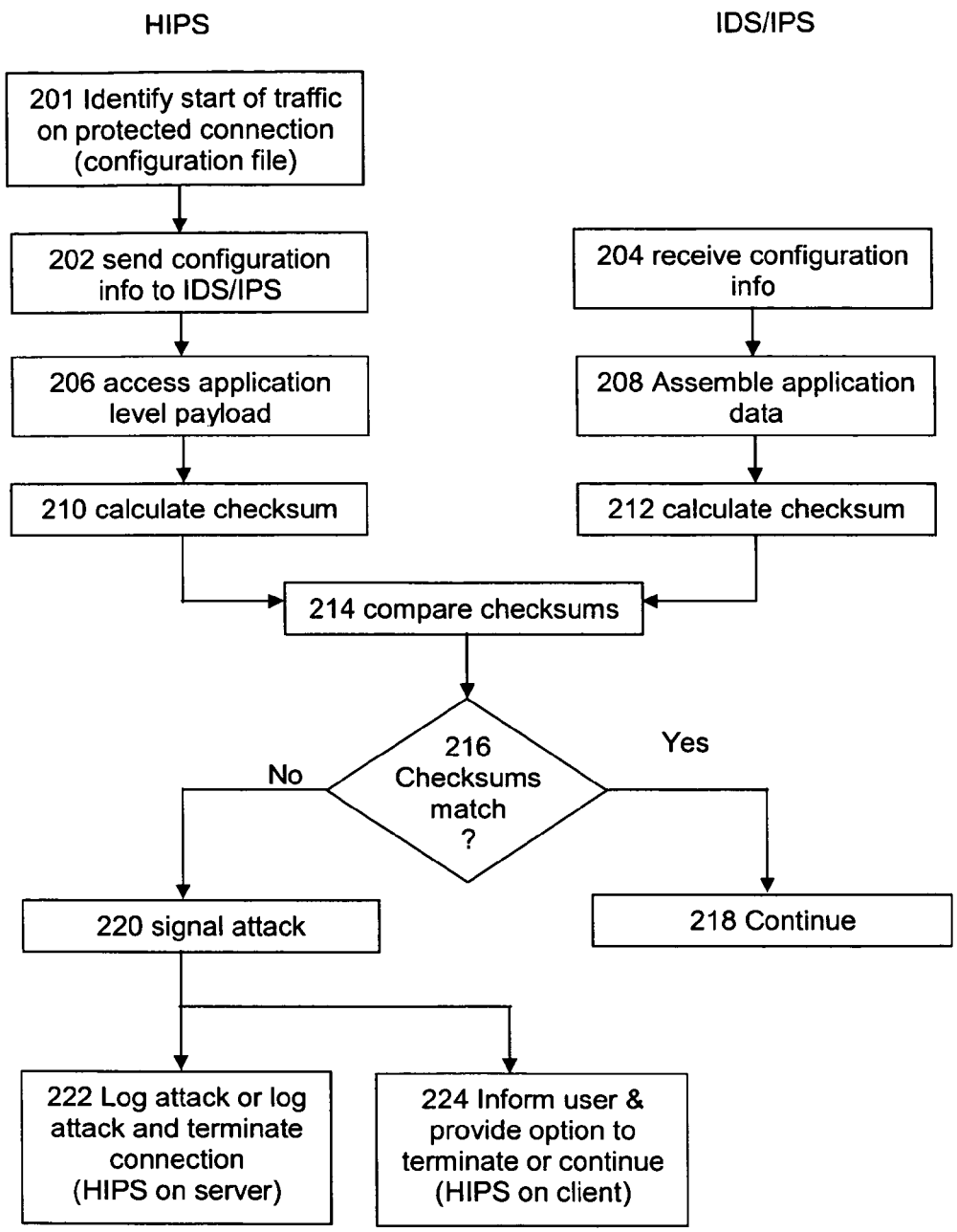
FIG. 2 is a flow diagram illustrating a procedure for identifying a potential attack network traffic.

According to one preferred embodiment, on the target host computer 102 the HIPS 104 has a configuration file that defines the type of connections that should be protected against a multi-AET attack. For example, the configuration file might include a list such as "HTTP, MSRPC, FTP, ARP, etc." FIG. 2 illustrates the method of identifying a potential attack. In FIG. 2, items shown on the left hand side are performed at the HIPS 104 on the target host computer 102, while items shown on the right hand side are performed at the IDS/IPS 106. The procedure starts at step 201 where the host computer identifies from the configuration file that a communication is starting through one of the protected connections. Before any traffic is sent or received, at step 202, the HIPS 104 sends the configuration file data to the IDS/IPS 106 through the communication channel 108, and this is received at step 204. Receipt of the configuration file acts as an indication that the HIPS 104 and the IDS/IPS need to cooperate in the following procedure.

When traffic commences, at step 206, the HIPS 104 accesses the application level payload bytes. In this example, this is done using network hooks, which enable access to payloads between any level/protocol layer. There are several hooking methods/APIs provided by MICROSOFT®, or for example browser software may include "hooking" functionality in the form of Browser Helper Objects that provide access to different http specific headers and payloads. The HIPS 104 then performs a check on the payload data, the result of which can be used to compare with a similar check performed on the equivalent data assembled by the IDS/IPS. In this example, at step 210 the HIPS calculates a checksum of the payload data bytes. For example, this might be a sliding checksum with offset information. Where the traffic is being sent and received by the host computer 102, the data check is performed on the application level payload in both directions.

Meanwhile, at step 208. the IDS/IPS assembles the equivalent application level payload data bytes from the monitored network traffic, and, at step 212 performs the same data check (i.e. checksum) calculation. In the IDS/IPS the application level data is reassembled from data fragments in the PDUs of the network traffic.

Figure 4:
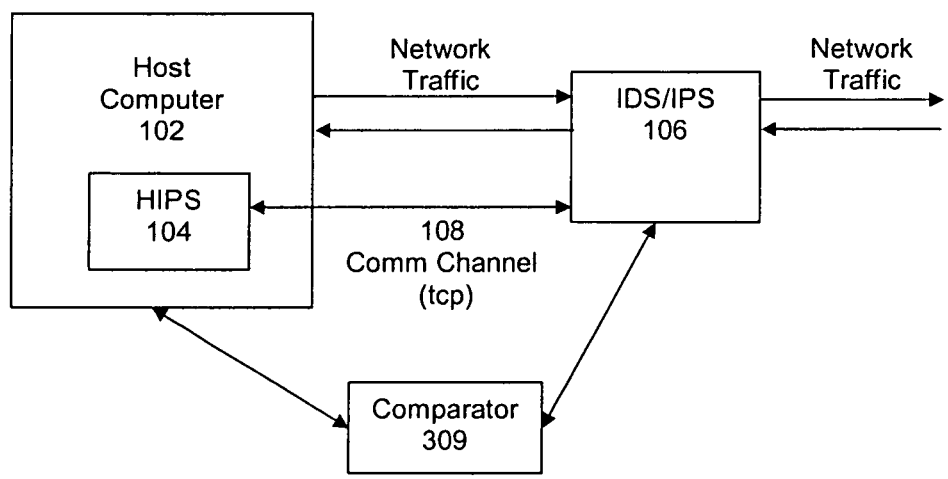
FIG. 4 is a schematic block diagram of a network host entity suitable for implementing some embodiments of the present invention showing data transfer paths.

The results of the data checks performed by the HIPS 104 and IDS/IPS 106 can now be compared (step 214). For example, the HIPS 104 may send the result of its checksum calculation over the communication channel 108 to the IDS/IPS 106, where the comparison is made. Alternatively, the IDS/IPS 106 could send the result of its checksum calculation to the HIPS 104. As another alternative shown in FIG. 4, both the HIPS 104 the IDS/IPS 106 could send the results of their checksum calculations to a checksum comparator 309 elsewhere in the network. On an on-going basis the checksums of the HIPS 104 and IDS/IPS 106 are continuously compared for payload bytes at the same time as the bytes are exchanged over the connections specified in the configuration file.

If, at step 216, it is determined that the checksums of the HIPS 104 and the IDS/IPS 106 are the same, then no action need be taken and the process continues (step 218).

However, if at step 216, it is determined that there is a mismatch between the checksums of the HIPS 104 and IDS/IPS 106, this is an indication of a potential attack, which could be using an AET, or possibly multiple AETs. At step 220 an attack is signaled (by whatever entity has performed the checksum comparison). In that case one of the following actions may be taken.

It will be appreciated that the IDS/IPS 106 continues to perform its normal functions of monitoring and checking for attacks. Also, once the checksum comparison at step 216 identifies a potential attack, the IDS/IPS 106 can proceed to identify the particular attack (AET) being used and take steps to nullify it.

If the target host computer 102 on which the HIPS 104 is installed is a server machine inspecting traffic relating to some service, then a preconfigured action is taken at step 222 such as terminating the connection and logging the detected attack, or just logging it. Alternatively, if the target host computer 102 is a client machine with the HIPS 104 installed on it inspecting traffic to another network entity (e.g. some web site) then at step 224 a prompt dialog is displayed on the client machine informing the client that it is probably being targeted. In that case, the user may be informed of the specific nature of the attack and given the option of either terminating the connection or accepting suspicious traffic. Alternatively, the system may be configured to automatically terminate the connection and notify the user accordingly.

Figure 3:
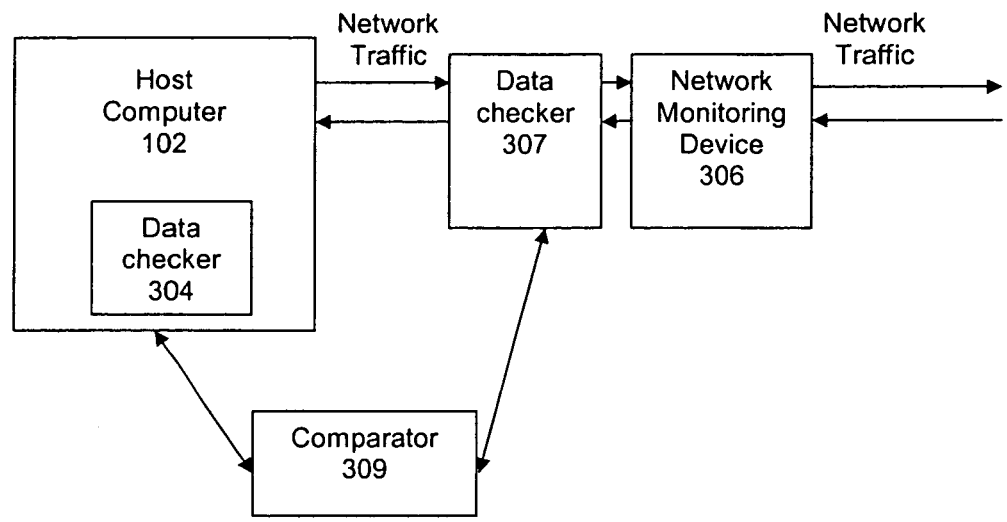
FIG. 3 is a schematic block diagram of a network host entity suitable for implementing some embodiments of the present invention showing data transfer paths.

FIG. 3 shows a network host entity suitable for implementing the present invention. The network monitoring device 306 monitors and checks the network traffic for attacks. The data checker 304 is configured to perform a data check on one or more data bytes of the payload data of an incoming packet. The data checker 307 is configured to perform a data check on an equivalent one or more data bytes of the network equivalent of the payload data. The comparator 308 compares the results of both data checks to determine if there is a mismatch, a mismatch being an indication that the results of the network monitoring device are inaccurate. It will be appreciated by a person skilled in the art that the data checkers could be implemented in other systems, such as the data checker 304 being implemented in a HIPS, and the data checker 307 and network monitoring device 306 being implemented in an IDS/IPS as in the above embodiments.

The method described above mitigates and at least partially solves the problem of preventing attacks (exploits) that utilize multiple AETs. This is because the method nullifies AETs of a particular attack that exist on for example the TCP/IP stack level. As a consequence, only application level AETs remain available for the attacker and, depending on the application level protocol and the vulnerability in question, in most, if not all cases the attacker will be unable to utilize more than one AET at one time and so will be unable to evade the IDS/IPS. Thus, although an attacker might be able to use multiple AETs at the IP or TCP levels, for most vulnerabilities only one application level AET can be used.

The methods described above offer enhanced protection against multi-AET attacks and could be provided, for example, to Internet Service Providers as an optional or additional extra protection service for its customers. The IDS/IPS vendor will also obtain instant feedback on the type of any multi-AETs used that it has not detected. This information can then be used to develop the IDS/IPS technology further.

The invention claimed is:

1. A method of identifying a potential attack in network traffic that includes payload data transmitted to a host entity in a network, the method including:
   monitoring and checking said traffic on route to said host entity for intrusion attacks;
   performing a first data-check on one or more data bytes of the payload data at the host entity;
   performing a second data-check, equivalent to the first data-check, on data of the network equivalent to the one or more bytes of payload data; and
   comparing the results of the first and second data-checks to determine if there is a mismatch, any mismatch being an indication that said step of monitoring and checking said traffic on route to said host entity for intrusion attacks is unreliable,
   wherein the first data-check is performed by a Host Intrusion Protection System (HIPS) and the second data-check is performed by an Intrusion Detection System/Intrusion Protection System (IDS/IPS).

2. The method of claim 1 wherein the HIPS is provided with a communication channel to the IDS/IPS, the results of the first and/or the second data-check being transmitted over the communication channel for the comparing.

3. The method of claim 2 further comprising providing the HIPS with configuration information specifying network connection types for which the method of identifying a potential attack is to be applied.

4. The method of claim 3 further comprising sending the configuration information to the IDS/IPS.

5. The method of claim 1 wherein the payload data is an application level payload, and wherein the HIPS uses network hooks for accessing the payload to perform the first data-check.

6. The method of claim 1 wherein the data-checks are compared as the bytes are transmitted over the network.

7. The method of claim 1 wherein the first data-check is performed on a server monitoring traffic on a connection relating to a service, the method further comprising performing a predetermined action in response to the indication that said monitoring and checking step is unreliable.

8. The method of claim 7 wherein the predetermined action comprises terminating the connection, or logging the potential attack, or both.

9. The method of claim 1 wherein the first data-check is performed on a client computer monitoring traffic on a connection between the client computer and a remote network entity, the method further comprising notifying a user of the client computer of the indication that said monitoring and checking step is unreliable.

10. The method of claim 9 further comprising providing an option for the user to terminate the connection or to accept the payload.

11. The method of claim 9 further comprising automatically terminating the connection.

12. The method of claim 1 wherein performing the first and second data-checks comprise calculating a checksum.

13. The method of claim 12 wherein the checksum calculation is a sliding checksum with offset information.

14. The method of claim 1 wherein the indication that said monitoring and checking step is unreliable is identified as an indication of an attack that might include a plurality of Advanced Evasion Techniques (AETs).

15. A method comprising:
monitoring and checking said traffic on route to the host to identify an attack in network traffic that includes application level payload transmitted to/from a host over a network connection and that includes a plurality of Advanced Evasion Techniques (AETs);
providing a Host Intrusion Protection System (HIPS) with a communication channel to an Intrusion Detection System/Intrusion Protection System (IDS/IPS);
the HIPS accessing at least a portion of the application level payload and calculating a checksum thereof;
the IDS/IPS performing an equivalent checksum calculation for an equivalent portion of the application level payload assembled therein;
comparing the checksums calculated by the HIPS and the IDS/IPS; and
signalling that said step of monitoring and checking said traffic on route to said host entity for intrusion attacks is unreliable if there is a mismatch.

16. A system comprising:
a network monitoring device configured to monitor and check said traffic on route to the host entity to identify a potential attack in network traffic that includes payload data transmitted to a host entity in a network;
a first data-checker configured to perform a first data-check on one or more data bytes of the payload data;
a second data-checker configured to perform a second data-check, equivalent to the first data-check, on data of the network equivalent to the one or more data bytes of the payload data; and
a comparator for comparing results of the first and second data-checks to determine if there is a mismatch, the mismatch being an indication that results from said network monitoring device are unreliable.

17. The system of claim 16 wherein the first data-checker is comprised within a Host Intrusion Protection System (HIPS) on the host entity, and the network monitoring device and the second data-checker are comprised within an Intrusion Detection System/Intrusion Protection System (IDS/IPS), the system further comprising a communication channel connecting the HIPS and the IDS/IPS.

18. The system of claim 17 wherein the HIPS is installed on a server and is configured to monitor traffic relating to a service.

19. The system of claim 17 wherein the HIPS is installed on a client computer and is configured to monitor traffic between the client computer and a remote network entity.

20. A system comprising:
a host computer that includes a network connection over which the network traffic is sent/received and a Host Intrusion Protection System (HIPS);
an Intrusion Detection System/Intrusion Protection System (IDS/IPS) for identifying an attack in network traffic that includes application level payload and that includes a plurality of Advanced Evasion Techniques (AETs);
a communication channel connecting the HIPS and the IDS/IPS;
wherein the HIPS is configured to access at least a portion of the application level payload and to calculate a checksum thereof, the IDS/IPS is configured to monitor and check said traffic on route to the host entity for attacks, and to perform an equivalent checksum calculation for an equivalent portion of the application level payload assembled therein; and
a comparator for comparing the checksums calculated by the HIPS and the IDS/IPS and for signalling that the monitoring and checking performed by said IDS/IPS is unreliable if there is a mismatch.

21. A computer network entity comprising:
a data-check comparator configured to perform a comparison between a first data-check of one or more data bytes of a payload of network traffic destined for a host entity and a second data-check, equivalent to the first data-check, on data of the network traffic equivalent to the one or more data bytes of the payload of network traffic and to signal that results of monitoring and checking said network traffic on route to said host entity for intrusion attacks are unreliable if the data-check comparison indicates a mismatch between the first and second data-checks,
wherein the first data-check is performed by a Host Intrusion Protection System (HIPS) and the second data-check is performed by an Intrusion Detection System/Intrusion Protection System (IDS/IPS).

* * * * *